（12）United States Patent
Lee

(10) Patent No.: US 6,282,199 B1
(45) Date of Patent: Aug. 28, 2001

(54) ATM SWITCH SYSTEM EMPLOYING AN EFFICIENT CLOCK PULSE DIVISION TECHNIQUE

(75) Inventor: Min Hyung Lee, Incheon (KR)

(73) Assignee: Mercury Corporation, Incheon (KR)

( * ) Notice: Subject to any disclaimer, the term of this patent is extended or adjusted under 35 U.S.C. 154(b) by 0 days.

(21) Appl. No.: 09/182,677

(22) Filed: Oct. 30, 1998

(30) Foreign Application Priority Data

Dec. 31, 1997 (KR) .................................................. 97-81785

(51) Int. Cl.⁷ ............................. H04L 12/28; H04L 12/56

(52) U.S. Cl. ............................................................. 370/395

(58) Field of Search ................................. 370/395, 324, 370/359, 360, 419, 420, 423, 465, 467, 474, 355, 356, 453, 457, 463, 476, 496, 503, 510, 512, 514, 520, 350, 241; 375/240.28

(56) References Cited

U.S. PATENT DOCUMENTS 5,384,774 * 1/1995 Martin et al. ........................ 370/395

* cited by examiner

Primary Examiner—Dang Ton
Assistant Examiner—Phirin Sam
(74) Attorney, Agent, or Firm—Bacon & Thomas, PLLC

(57) ABSTRACT

An asynchronous transfer mode (ATM) switch system generates a divided clock pulse to be used in converting ATM cells into data of unit of a predetermined bit length. In the system, a clock pulse and a plurality of cell synchronization signals with different phases are obtained first. Based on the clock pulse and the cell synchronization signals, a selection control signal and a reset signal are issued. In response to the selection control signal, one of the cell synchronization signals is selected. An initialization control signal is derived in accordance with the selected one cell synchronization signal and the reset signal. In response to the initialization control signal, the divided clock pulse is obtained based on a previous divided clock pulse to generate the divided clock pulse.

6 Claims, 2 Drawing Sheets

ATM SWITCH SYSTEM EMPLOYING AN EFFICIENT CLOCK PULSE DIVISION TECHNIQUE

FIELD OF THE INVENTION

The present invention relates to an asynchronous transfer mode (ATM) system; and, more particularly, to an ATM switch system for efficiently providing a divided nibble clock pulse to be used in converting ATM cells into data with a preset bit length at a device in the system.

BACKGROUND OF THE INVENTION

In an asynchronous transfer mode (ATM) switch system, an ATM node connects an ATM network to another ATM network or to ATM subscribers. The ATM switch system handles information of ATM cells, each cell having a predetermined fixed bit length and being transferred asynchronously in the ATM network.

Conventionally, the ATM switch system incorporates therein a switch device, a subscriber access block, a trunk access device, a plurality of link devices, and a device controller. The switch device exchanges the ATM cells between, e.g., two link devices. Each of the link devices performs serial/parallel conversion to transfer ATM cells between the switch device and the subscriber access device or the trunk access device, receives the ATM cells serially from the access device and provides the switch device with the received ATM cells parallel, e.g., with 4-bit data width (nibble-by-nibble), and a cell synchronization signal, e.g., a nibble cell synchronization (NCS) signal, activated during a first nibble transfer of each ATM cell.

Each of the link devices also monitors cell synchronization and applies a synchronization loss signal to the device controller. Specifically, each of the link devices checks whether or not the ATM cell applied thereto is synchronized with the NCS signal and activates the synchronization loss signal when the ATM cell is not synchronized with the NCS signal. For example, if one of the link devices is not connected physically to the subscriber access device/trunk access device, or is not synchronized with the access device/trunk access device, or has a heavy fault therein, said one of the link devices activates the corresponding synchronization loss signal.

The device controller checks periodically, e.g., at every 1 millisecond, the status of the synchronization loss signal applied from each of the link devices. When the device controller detects the activation of the synchronization loss signal from said one of the link devices, the device controller applies a malfunction signal to the switch device. In response to the malfunction signal, the switch device issues a control signal to said one of the link devices to replace same with a substitution device of the link devices.

Each of the devices incorporated in the ATM switch system, on the other hand, includes a clock generation unit which generates a nibble clock pulse (NCP) and two or more NCS signals. Said two or more NCS signals have different clock phases, wherein, for example, there are phase differences of 2N or 2N+1 periods of the NCP between them, N being a positive integer. As is known in the art, the NCP is used to process each of the ATM cells synchronously, whereas each NCS is used for each device to inform a counterpart device of the beginning point of time of the ATM cells. One of the two or more NCS signals is used for said each device to transfer ATM cells to a counterpart device synchronously; and the remainder of the two or more NCS signals are used for said each device to receive ATM cells transmitted from the counterpart device synchronously. The number of the one or more NCS signals corresponds to that of the devices in the ATM switch system.

Each device further includes a clock pulse division unit which produces a divided NCP to be used in converting the ATM cells of unit of nibble into data of unit of a preset bit length, e.g., byte, wherein the divided NCP is obtained by dividing the NCP by two. Based on the divided NCP, said each device converts the ATM cells applied thereto into data of unit of byte and then processes the data converted.

Since, however, the divided NCP is obtained by using only the NCP without taking into account the two or more NCS signals, there may exist phase discrepancies between each of the NCS signals and the divided NCP. Accordingly, in case a device in the ATM switch system alternately employs the two or more NCS signals, ATM cells being processed in the device may be lost or corrupted, lowering the reliability of data in the ATM switch system.

SUMMARY OF THE INVENTION

It is, therefore, a primary object of the present invention to provide an ATM switch system capable of improving the reliability of data being processed in the system by employing an efficient clock pulse division technique.

In accordance with the present invention, there is provided an asynchronous transfer mode (ATM) switch system for generating a divided clock pulse to be used in converting ATM cells of unit of a first predetermined data length into data of unit of a second predetermined data length, the system comprising:

means for generating a clock pulse and a plurality of cell synchronization signals with different phases;

means for issuing a selection control signal and a reset signal based on the clock pulse and the cell synchronization signals;

means, in response to the selection control signal, for selecting one of the cell synchronization signals;

means for generating an initialization control signal based on the selected cell synchronization signal and the reset signal; and means, in response to the initialization control signal, for dividing the clock pulse by M based on a previous divided clock pulse, M being a positive integer larger than 1, to thereby generate the divided clock pulse.

BRIEF DESCRIPTION OF THE DRAWINGS

The above and other objects and features of the present invention will become apparent from the following description of preferred embodiments given in conjunction with the following accompanying drawings, in which.

DETAILED DESCRIPTION OF THE PREFERRED EMBODIMENTS

Figure 1:
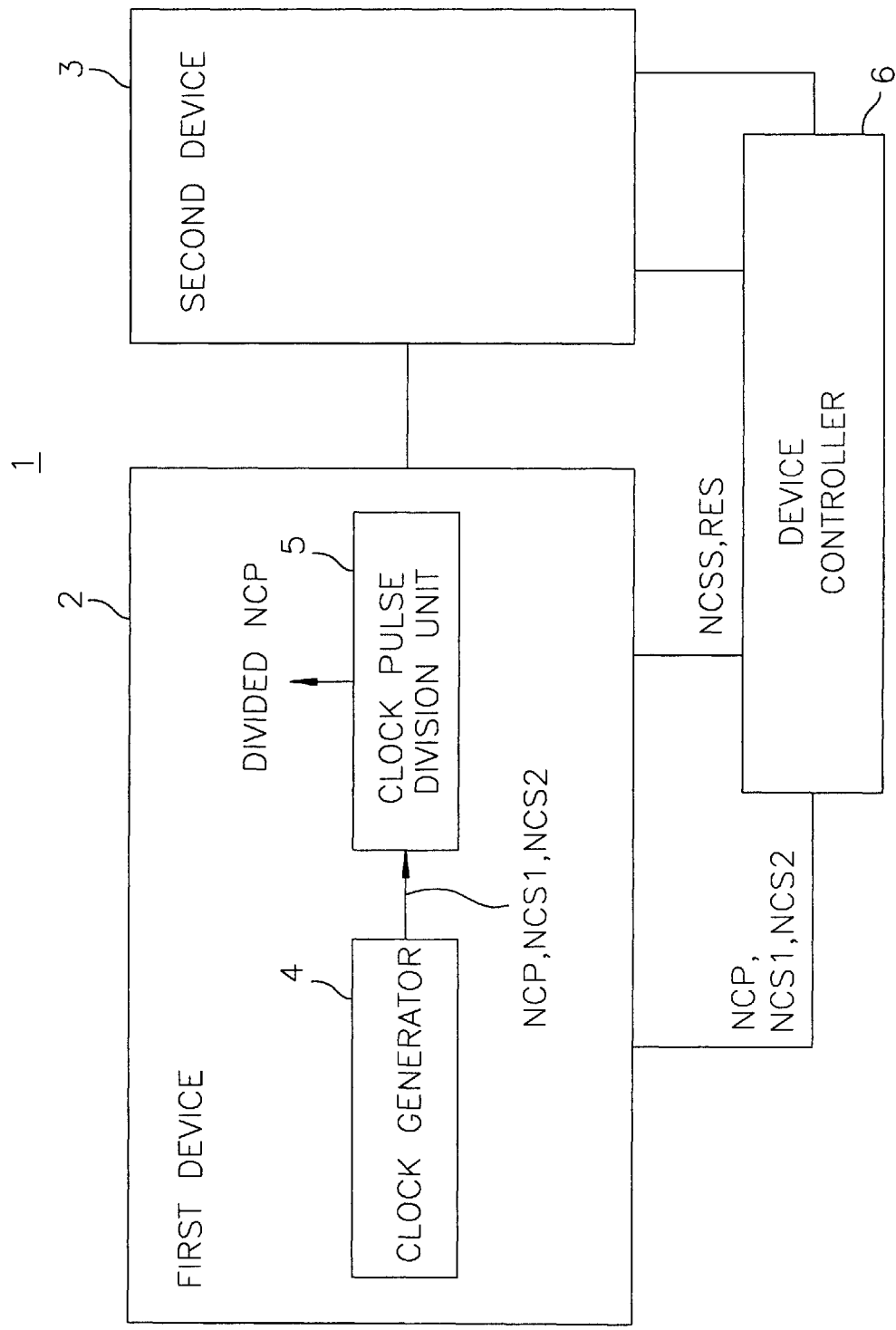
FIG. 1 is a block diagram of a novel ATM switch system in accordance with the present invention.

Referring to FIG. 1, there is provided a block diagram of an ATM switch system 1 incorporating therein a novel clock pulse division unit employing an efficient clock pulse division technique in accordance with the present invention. The inventive ATM switch system 1 comprises a plurality of devices such as a switch device, a subscriber access device, a trunk access device (not shown), a device controller 6, and the like. For the sake of simplicity, in FIG. 1, there are illustrated only two devices, 2 and 3, out of the devices, and the device controller 6. As will be fully explained below, the inventive ATM system 1 efficiently employs a same number of NCS signals as the number of the devices incorporated within the ATM switch system 1, i.e., two NCS signals, NCS1 and NCS2. Using such NCS signals, a divided NCP to be used in converting ATM cells of unit of nibble into data of unit of a preset bit length, e.g., byte, at each device can be effectively obtained without incurring phase discrepancies between each of the NCS signals and the divided NCP. Based on the divided NCP, said each device converts ATM cells applied thereto into data of unit of byte and then processes the data converted, thereby improving the reliability of data in the system 1.

Each of the two devices, e.g., the first device 2, includes a clock generator 4 and a clock pulse division unit 5. Hereinafter, only one device, e.g., 2, will be illustrated in detail instead of the two devices for the sake of simplicity. The first clock generator 4 generates the two NCS signals, NCS1 and NCS2, with different clock phases from each other, wherein, for example, there may be phase difference of 2N or 2N+1 periods of an NCP between the NCS1 signal and the NCS2 signal, N being a positive integer. It is assumed that periods of the NCP. One of the two NCS signals, e.g., NCS1, is used for controlling the first device 2 to transfer ATM cells to its counterpart device, i.e., the second device 3, synchronously; and the other, i.e., NCS2, is used for controlling the first device 2 to receive ATM cells transmitted from the second device 3 synchronously. The signals, NCS1 and NCS2, are applied to the clock pulse division unit 5 and to the device controller 6. And an NCP is also generated from the clock generator 4 to provide same to the clock division unit 5 and the device controller 6, wherein, as is known in the art, the NCP is used to process each of ATM cells synchronously.

Using a nibble cell synchronization selection (NCSS) signal and a reset (RES) signal issued from the device controller 6 together with the signals, NCS1 and NCS2, and the NCP from the clock generator 4, the clock pulse division unit 5 produces the divided NCP which always provides accurate phase synchronization between itself and each of the two NCS signals. Details of the generation of the divided NCP at the clock pulse division unit 5 will be described with reference to FIG. 2 hereinafter. The device controller 6 monitors the NCP and the two NCS signals provided from the clock generator 4; and not only issues the NCSS signal and the RES signal to the clock pulse division unit 5, but also controls operations of all the devices in the ATM system 1.

Figure 2:
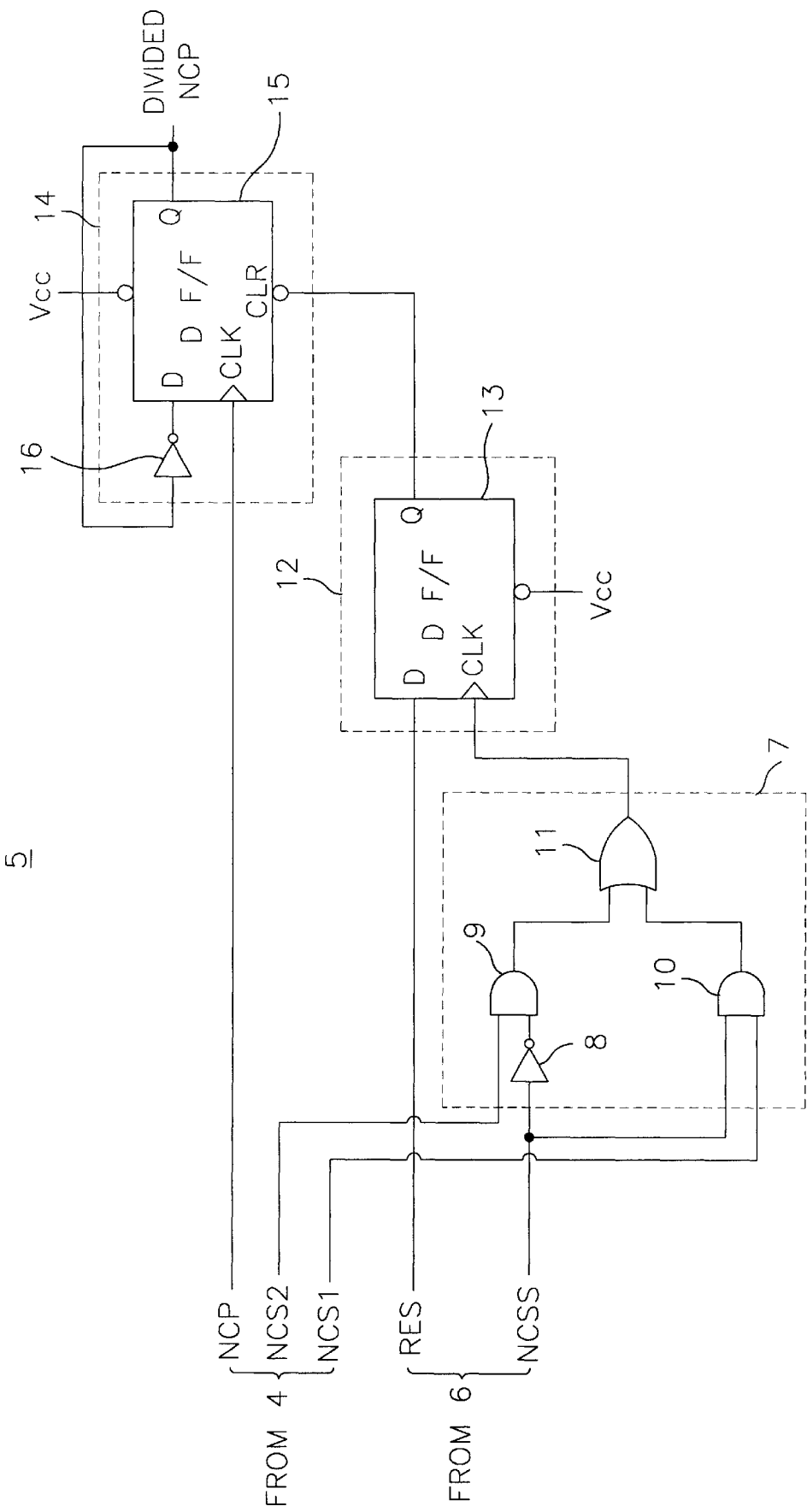
FIG. 2 presents a detailed circuit diagram of the clock pulse division unit shown in FIG. 1.

Turning now to FIG. 2, there is provided a detailed circuit diagram of the clock pulse division unit 5 shown in FIG. 1. The clock pulse division unit 5 includes a selection circuit 7, an initialization circuit 12 and a division circuit 14. As shown in FIG. 2, the selection circuit 7 has an inverter 8, two AND gates 9 and 10 and an OR gate 11; and the initialization circuit 12 and the division circuit 14 has D flip/flops (F/F's), 13 and 15, respectively.

Specifically, the NCS1 and the NCS2 from the clock generator 4 are coupled to their respective corresponding AND gates 9 and 10, while the NCSS signal from the device controller 6 is coupled via the inverter 8 to the AND gate 9 and coupled directly to the AND gate 10. Using such a circuit arrangement, one of the signals, NCS1 and NCS2, is selectively outputted from the OR gate 11 in the selection circuit 7 in response to a logic level of the NCSS signal. For instance, if a status wherein the NCS1 is selected and is used in the ATM switch system 1 is detected by the device controller 6, the device controller 6 issues, within a predetermined period of time, the RES signal of a logic high to a D input of the D F/F 13 and the NCSS signal of a logic high to the AND gates 9 and 10. In response to the NCSS signal of the logic high, the NCS1 is outputted from the OR gate 11 by way of the AND gate 10; and, in response to the NCSS signal of a logic low, on the other hand, the NCS2 is provided from the OR gate 11 through the inverter 8 and the AND gate 9. The output from the OR gate 11 is then delivered to the CLK input of the D F/F 13 involved in the initialization circuit 12

If an input to the CLK input of the D F/F 13 is a default NCS signal, e.g., the NCS1, preset by the ATM switch system 1, an output Q therefrom is a logic high signal based on the RES signal to the D input and it is applied to a clear (CLR) port of the D F/F 15 in the division circuit 14. To be more specific, the Q output from the D F/F 13 is the logic high signal when a rising edge of a pulse of the NCS1 is applied to the CLK input of the D F/F 13. It should be noted that the RES signal changes from logic high to logic low in the time interval between the occurrence of the pulse of the NCS1 and the occurrence of a first pulse of the NCS2, as will be mentioned below.

In response to the logic high signal from the Q output of the D F/F 13, the D F/F 15 is activated through the use of the NCP coupled to a CLK input thereof and an inversion signal of a previous divided NCP applied to its D input through an inverter 16, to thereby generate the divided NCP. The divided NCP may be obtained by dividing the NCP by two in synchronization with, e.g., a rising edge of the NCP.

However, if a rising edge of the first pulse of the NCS2 is applied to the CLK input of the D F/F 13 in the initialization circuit 12, implying that the NCS signal has been changed from the NCS1 to the NCS2, the Q output from the D F/F 13 is now changed from the logic high signal to a logic low signal and applied to the CLR port of the D F/F 15. In this case, of course, the NCSS signal from the device controller 6 will be changed from logic high to logic low upon detection of the change in the NCS signal and then will be applied to the inverter 8 and the AND gate 10. In response to the logic low signal from the D F/F 13, the D F/F 15 will not be operated until a rising edge of a second pulse of the NCS2 is applied to the CLK input after issuance of the first pulse of the NCS2. In this case, the Q output from the D F/F 15 is a logic low level.

After occurrence of the first pulse of the NCS2, if a rising edge of the second pulse of the NCS2 is applied to the CLK input of the D F/F 13, the output therefrom is changed back from the logic low signal to a logic high signal based on the RES to the D input of the D F/F 13. It should be appreciated that there is a level change of the RES signal from the logic low to the logic high prior to occurrence of the second pulse of the NCS2 under the control of the device controller 6. The logic high signal from the D F/F 13 is then provided to the CLR port of the D F/F 15; and, therefore, the D F/F 15 is activated to output the divided NCP.

As a result, in accordance with the invention, by initializing the operation of the division circuit 15 when one of NCS signals being used in a device of the ATM switch system 1 is changed instantly to another NCS signal with a different clock phase, there incurs no phase discrepancy between each of the NCS signals and the divided NCP, thereby improving the reliability of data in the ATM switch system.

While the present invention has been shown and described with respect to the particular embodiments, it will be apparent to those skilled in the art that many changes and modifications may be made without departing from the spirit and scope of the invention as defined in the appended claims.

What is claimed is:

1. An asynchronous transfer mode (ATM) switch system for generating a divided clock pulse to be used in converting ATM cells of unit of a first predetermined data length into data of unit of a second predetermined data length, the system comprising:

means for generating a clock pulse and a plurality of cell synchronization signals with different phases;

means for issuing a selection control signal and a reset signal based on the clock pulse and the cell synchronization signals;

means, in response to the selection control signal, for selecting one of the cell synchronization signals;

means for generating an initialization control signal based on the selected one cell synchronization signal and the reset signal; and means, in response to the initialization control signal, for dividing the clock pulse by M based on a previous divided clock pulse, M being a positive integer larger than 1, to thereby generate the divided clock pulse.

2. The system of claim 1, wherein each of the number of the cell synchronization signals and M is 2.

3. The system of claim 2, wherein one of the two cell synchronization signals is used for controlling one of devices incorporated in the system to transfer ATM cells to a counterpart device out of the devices synchronously, and the other is used for controlling said one device to receive ATM cells transmitted from the counterpart device synchronously, wherein the devices are a switch device, a subscriber access device, a trunk device and a link device.

4. The system of claim 1, wherein the first predetermined data length is 4-bit and the second predetermined data length is 8-bit.

5. The system of claim 1, wherein the selecting means includes two AND gates, an inverter connected to an input port of one of the two AND gates and an OR gate coupled to output ports of the two AND gates.

6. The system of claim 1, wherein the initialization control signal generating means is a flip-flop and the dividing means includes a flip-flop and an inverter coupled to an input and an output ports of the flip-flop.

* * * * *